United States Patent Office 2,954,290
Patented Sept. 27, 1960.

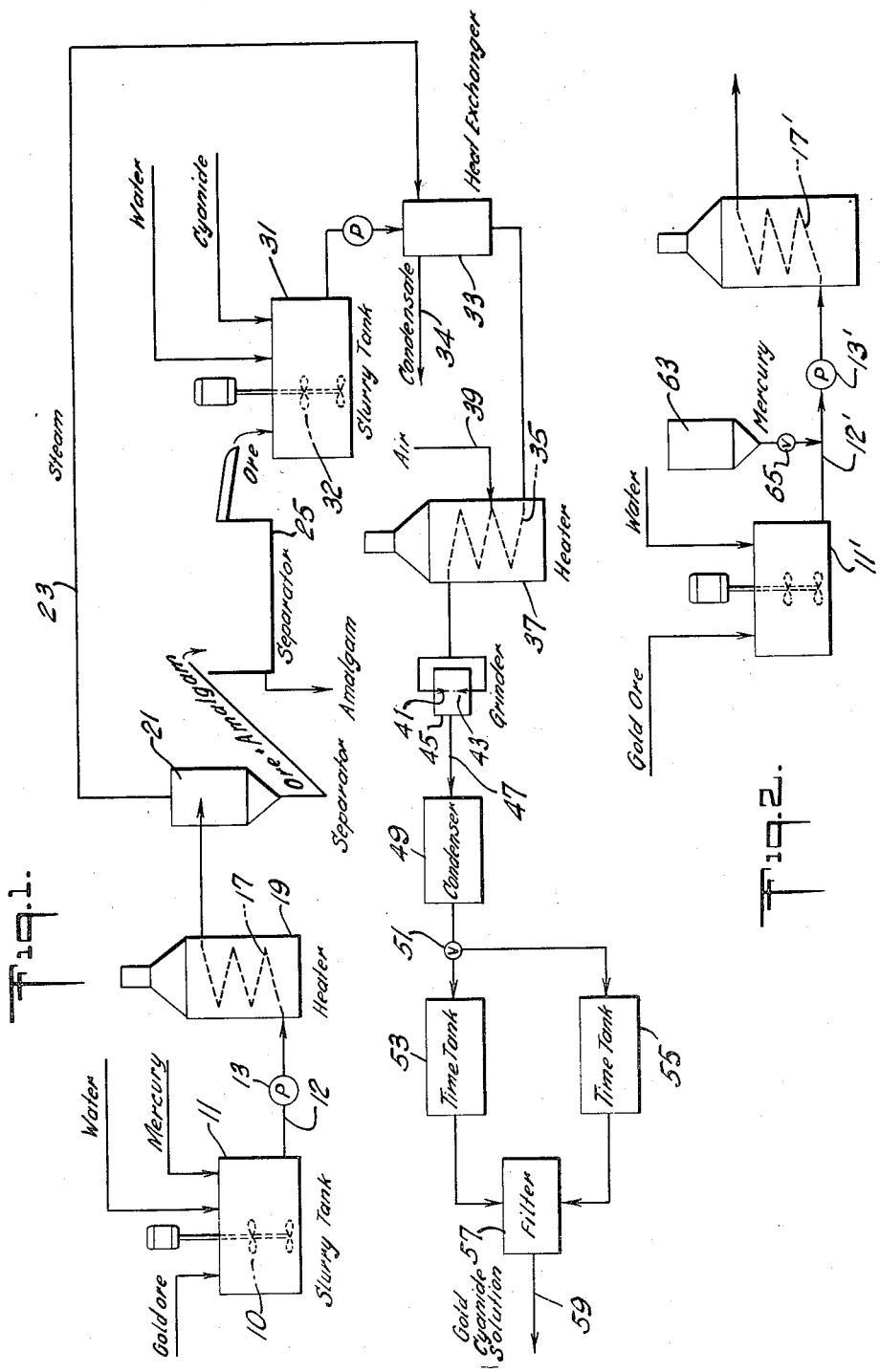

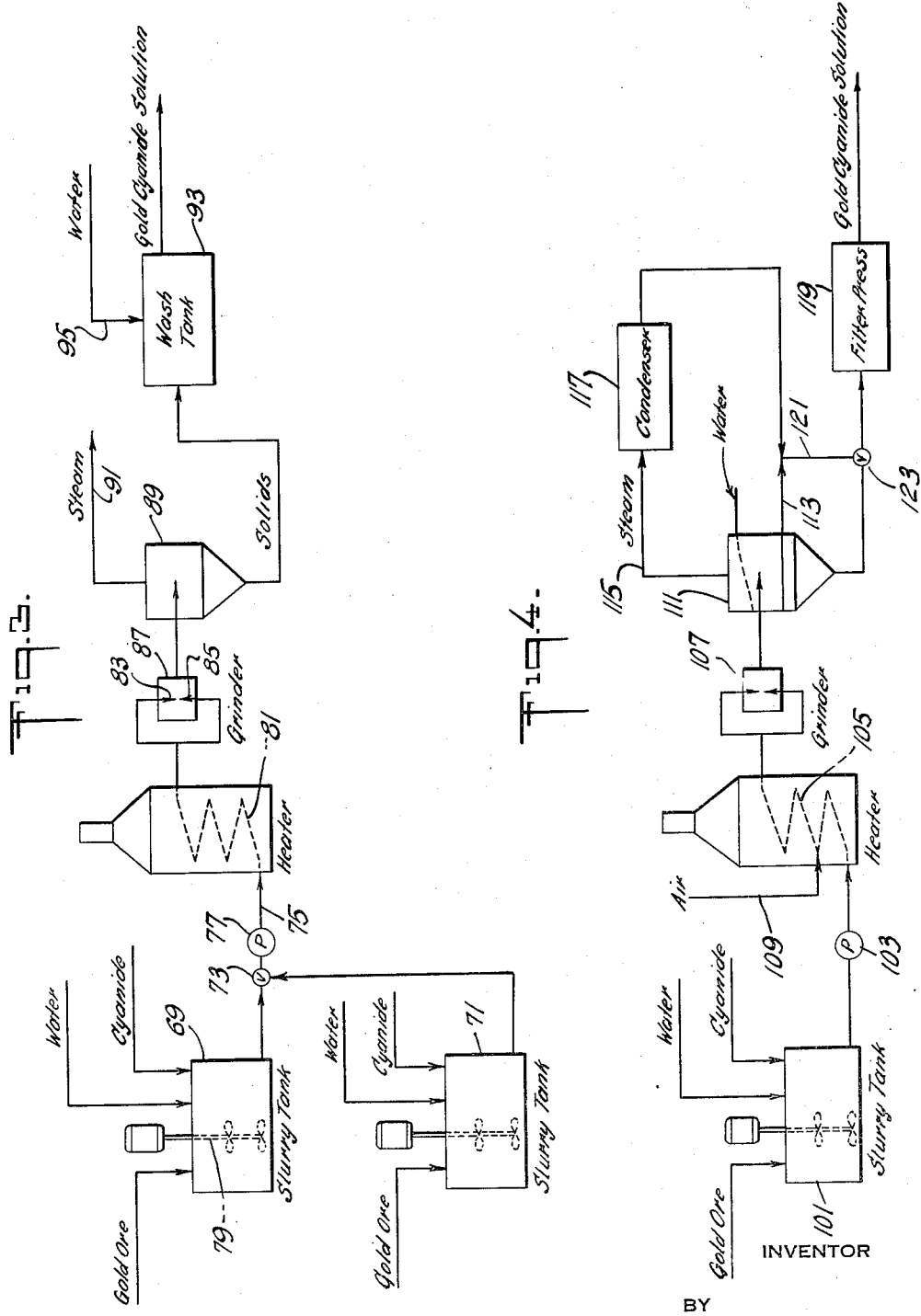

2,954,290

PROCESS FOR RECOVERING METAL VALUES FROM GOLD AND SILVER ORES

Charles F. Teichmann, Crestwood, N.Y., and Peter L. Paull, Norwalk, Conn., assignors to Texaco Development Corporation, New York, N.Y., a corporation of Delaware Filed Oct. 4, 1956, Ser. No. 613,872

5 Claims. (Cl. 75—118)

The present invention relates to a novel process for treating gold and silver ores bearing native metal, so as to recover the metal values therefrom. It is particularly concerned with improvements in procedures for recovering such metal values by one or both of the steps of amalgamation and cyanidation.

Native gold and silver are frequently present in minor quantity in association with quartz and other minerals such as the sulfide minerals, pyrite, galena, chalcopyrite, sphalerite, arsenopyrite, tetrahedrite, and pyrrhotite; and gangue minerals such as calcite, sericite, fluorite, rhodochrosite, siderite, feldspar, and clay minerals.

In accordance with the preferred embodiment of the present invention such gold and silver ores containing native metal are treated by a combinaton of amalgamation and cyanidation. There is first formed a flowable mixture or slurry of particles of the ore with water and liquid mercury. This mixture is then passed as a flowing stream into and through a confined heating zone, such as a long coiled tube, wherein the mixture is heated sufficiently to vaporize water while maintaning most of the mercury in a liquid sate, thereby forming a flowing dispersion of the ore particles in steam. The dispersion is passed at high velocity and in highly turbulent flow through a succeeding zone whereby the mercury (both liquid, and vapor when present) contacts and amalgamates with the native metal, forming an amalgam. The resulting amalgam is then separted from the residual ore particles, which thereafter are subjected to cyanidation in the presence of oxygen to recover the remaining metal values therefrom.

It is particularly advantageous to subject the residual ore particles to cyanidation in the presence of oxygen by forming a second flowable mixture such as a slurry of the residual ore particles in a water solution of alkali metal cyanide, such as sodium or potassium cyanide. This second mixture is fed as a flowing stream into and through a second confined heating zone wherein the mixture is heated sufficiently to vaporize the water from the solution, thereby forming a flowing second dispersion of residual ore particles in steam. The residual ore particles are disintegrated to a finer size by passing the dispersion through a succeeding zone of high velocity flow and subjecting the flowing stream therein to turbulence and a high velocity which should be greater than 25 feet per second. Then the resulting cyanide reaction products are separated from the gangue.

The amalgamation and cyanidation steps described above can be used in conjunction with one another as described; or they can be employed independently for the treatment of gold and silver ores.

The invention is highly advantageous because it is a rapid, economic, and continuous operation combining size reduction of the ore with unusually efficient extraction of the native gold and silver.

In the drawings:

Fig. 1 is a schematic flow diagram showing an arrangement of apparatus for performing the complete process of the invention, including both amalgamation and cyanidation;

Fig. 2 is a schematic flow diagram of a part of the appartus shown in Fig. 1, but employing a different arrangement for feeding mercury into the system;

Fig. 3 is a schematic flow diagram of another arrangement of apparatus for performing the cyanidation step of the invention; and Fig. 4 is a schematic flow diagram showing still another arrangement of apparatus for performing the cyanidation step of the invention.

*Amalgamation step*

As shown in Fig.1, ore particles which have been previously crushed to a relatively coarse size such as to pass through a 14 mesh U.S. standard sieve are mixed with water and a small amount of liquid mercury in a slurry tank 11 to form a pumpable slurry. Continuous feed of ore particles, water, and mercury to tank 11 in the selected proportions is advantageous. An agitator 10 assures maintenance of a suspension.

The ratio of ore to water may vary considerably, but is generally between 1:2 and 2:1 by weight, often being 1:1. The amount of mercury used depends to a considerable extent upon the amount present of amalgamable gold and silver particles, generally being between .01 and 10% by weight of the ore.

The slurry is pumped continuously through a conduit 12 by a pump 13 at a linear velocity which usually is ½ to 10 feet per second into the initial portion of an elongated conduit or tubular zone including a long externally heated heater tube 17 located within a heater 19, which may be fired in any desired way, as by oil or gas. Tube 17 can be coiled, or in the form of parallel straight tubes connected together by return bends; and the tube may be composed of two or more sections located in individual heaters.

In the initial portion of tube 17 the slurry is rapidly heated to a temperature above the boiling point of water at the existing pressure to vaporize all of the water to steam, but preferably below the boiling point of mercury, and a flowing stream of a dispersion of coarse ore particles, mercury and mercury amalgam in steam is created. This dispersion and the accompanying mercury pass in highly turbulent flow through the latter portion of the tube 17 so that the mercury contacts and amalgamates with the available native metal particles forming an amalgam. By employing a dispersion velocity greater than 25 feet per second, a substantial reduction in the size of the ore particles also occurs, as a result of particle collisions with one another; and the free gold particles are cleaned of any tarnish which usually hinders amalgamation, thus exposing clean metal surfaces. It is not known for certain just what is the reason for the superiority of our amalgamation step, but it is believed that turbulent flow in the tube 17 causes the mercury to be broken into small liquid droplets which come into intimate contact with the small clean metal and ore particles and amalgamate very efficiently with the metal.

If desired, the latter portion of tube 17 may include pairs of opposed nozzles, or a convergent-divergent orifice to improve disintegration.

The dispersion then passes from coil 17 to a separator 21, such as a centrifugal cyclone separator, in which the steam is separated from the mercury amalgam and residual ore and passes off the top through a conduit 23. Some mercury vapor also leaves with the steam and can be recovered by cooling and condensing. The residual ore particles and mercury amalgam leave the bottom of the separator and are delivered into a second separator 25 for separating the liquid mercury amalgam from the solids by jigging, sedimentation, or other well known procedure. The amalgam is removed from separator 25 and treated in conventional ways to recover its gold and silver content.

The amalgamation step can be used alone when the gold or silver are mostly removed therein, but when there is left an economically recoverable amount of metal in the residual ore, it can be recovered by cyanidation.

*Cyanidation step*

The residual ore particles from separator 25 are then delivered continuously into a second slurry tank 31 where they are mixed with a water solution of alkali metal cyanide supplied continuously in the proper proportions to form a flowable mixture or slurry of the ore particles in a cyanide solution. Hydrolysis of the cyanide solution can be suppressed, if desired, by including a small amount of alkali metal hydroxide therein. To assure access of oxygen, tank 31 is open to the atmosphere, and the slurry is agitated constantly by an agitator 32.

The ratio of ore to liquid in tank 31 is generally between 1:2 and 2:1 by weight, often being 1:1. The amount of alkali metal cyanide employed depends upon the assay of the ore, as is well known in the art, but generally will be between 0.001 and 0.5% of the water by weight. Sodium or potassium hydroxide, when used, should be present in about the same proportion as the cyanide.

The slurry from tank 31 passes through a heat exchanger 33 wherein it is preheated by the steam from conduit 23, and then flows into a heater coil 35 in a heater 37 wherein it is heated to a temperature sufficient to vaporize all of the water and create a highly turbulently flowing stream consisting of a dispersion of residual ore particles and cyanide in steam. Condensed water and mercury pass through conduit 34 back to slurry tank 11. Meanwhile oxygen (either relatively pure, or in air) is introduced into the heater coil 35 from a conduit 39 to assure efficient cyanidation.

The dispersion then flows at a velocity in excess of 25 feet per second, and usually between 25 and 100 feet per second, to a pair of opposed small bore nozzles 41 and 43 in a grinder head 45. A pair of jets of dispersion then impinge against one another at a large angle such as 180°, and at a greatly increased velocity such as hundreds or thousands of feet per second, and cause the ore particles to disintegrate to an extremely fine state by impact of particles against one another. Particle sizes as small as 100% minus 200 mesh are obtained, with many particles as small as 100 microns or less.

If desired, the opposed nozzles may be eliminated, or may be replaced by a convergent-divergent orifice.

The dispersion then flows through a conduit 47 to a condenser 49 wherein it is fully condensed, after which the resulting reformed slurry is passed through a three way valve 51 to one of the two time tanks 53 or 55 wherein it is held as a pool for a time sufficient to insure completion of the cyanidation reaction. This may be for a period ranging between a few hours to a day or more, as necessary. Upon completion of the reaction the cyanide solution and gangue are passed to a separator 57 such as a filter press or rotary filter wherein the gangue particles are retained as filter cake while the metal cyanide reaction product solution passes on to a conduit 59 for treatment in a conventional manner to recover the gold and silver.

Continuous operation is assured by providing two or more time tanks so that one time tank is always discharging through a filter to the conduit 59, while the others complete digestion of the ore with cyanide solution.

Ten tons of gold ore assaying three troy ounces of gold per ton, which has been ground to pass through a 14 mesh screen, is charged to slurry tank 11 together with 3600 gallons of water to provide a slurry containing 40% of ore by weight. Then 20 pounds of mercury are introduced into the slurry tank 11 to provide about ten times the amount of mercury theoretically required for a pasty amalgam. Suspension of mercury and ore in the water is maintained by agitator 10.

The slurry is then pumped at a rate of 800 pounds per hour and at a pressure of 500 pounds per square inch through 300 feet of ½ inch extra heavy heated iron pipe coils 17 and then into the cyclone separator 21. The temperature at the inlet to the cyclone separator is 650° F. and the pressure is atmospheric.

The slime from the bottom of separator 21, containing 2.5 pennyweight of gold per ton, is then freed of mercury amalgam by settling in separator 25, and passed continuously into a second slurry tank 31 in which it is mixed with a continuously supplied equal weight of a water solution containing 0.05% of potassium cyanide.

The slurry from tank 31 is pumped into 1320 feet of heated ½ inch iron pipe 35 at a pressure of 1450 p.s.i.g. and a rate of 640 pounds per hour. The slurry is heated to a maximum temperature of 717° F. at the heater pipe outlet where the discharge pressure is 725 p.s.i.g. The resulting dispersion then flows to a pair of 180° opposed nozzles 41 and 43 having $5/32$ inch discharge orifices spaced $5/8$ inch apart, and thereafter is discharged into a condenser 49 wherein complete condensation and reformation of the slurry takes place.

From condenser 49 the slurry passes into time tank 53 wherein it resides for four hours, and is then filtered and the filtrate recovered for subsequent treatment to obtain the gold therefrom.

Referring now to Fig. 2, an alternative procedure for supplying the mercury to form the first flowable mixture of the amalgamation step is shown. A slurry of ore and water is made up in slurry tank 11' and fed through a conduit 12' by a pump 13' into a heater coil 17', as described previously. Mercury is held in a vessel 63 which is connected to the conduit 12' up-stream of pump 13', and the flow of mercury into the conduit is regulated by a throttle valve 65. When operating with this arrangement, there is no problem of obtaining a uniform distribution of mercury in the slurry, as may sometimes occur in the Fig. 1 modification due to the tendency of the heavy mercury to sink to the bottom.

Fig. 3 shows only the cyanidation portion of a system for recovering gold and silver. However, it is to be understood that the ore to be treated may be either freshly ground virgin ore, or may be ore which has been previously treated by amalgamation.

A pair of open slurry tanks 69 and 71 are provided, alternatively connected through a three way valve 73 into a conduit 75 upstream of a feed pump 77.

A slurry of ore in a water solution of alkali metal cyanide is made up in tank 69 and allowed to remain as a pool while being agitated by a stirrer 79 so as to assure cyanidation of the metal particles. This may take only a few hours, or a day or more. Then the slurry is passed through conduit 75 into a heated coil 81 wherein the water is vaporized and a stream of dispersion is formed. This dispersion flows to a pair of opposed nozzles 83 and 85 in a grinder head 87 and the two resulting jets impinge against one another at a large angle such as 180° in high velocity turbulent flow for disintegrating the ore particles. Cyanidation is substantially completed during this part of the process.

From grinder 87 the relatively low pressure dispersion flows into cyclone separator 89 and the steam is taken off the top through a conduit 91. The cyanided ore particles leave the bottom of cyclone separator 89 and are passed to a wash tank 93 wherein they are washed thoroughly with water from a conduit 95, after which the resulting water solution of metal cyanides is separated from the gangue by decantation, or in any other desired way such as filtration, whereby the valuable cyanide solution is recovered.

Meanwhile, a similar slurry has been made up in tank 71 and is allowed to remain in an agitated pool to assure digestion of the metal particles by the cyanide while the slurry tank 69 is on stream. After tank 69 has been emptied of slurry, the valve 73 is turned to place the tank 71 on stream and repeat the process as described above.

In Fig. 3, total condensation of the effluent from grinder 87 may be employed if desired, as described in connection with Fig. 1, followed by filtration. This avoids cyanide loss with the effluent steam from separator 89.

The conditions described in the foregoing example for the cyaniding portion of the system also apply here.

Fig. 4 also shows only a modified cyanidation portion of the system. A slurry of ore in a water solution of alkali metal cyanide is made up in tank 101 and then passed by a pump 103 into a heater coil 105, after which the resulting steam dispersion passes through a grinder head 107, all as previously described in connection with Fig. 3. To assure reaction of the cyanide with the metal in the ore, oxygen in the form of substantially pure oxygen or air is introduced into heater coil 105 through a conduit 109.

Upon leaving grinder 107 the relatively low pressure dispersion passes to a cyclone separator 111 having a water cooling coil 113 associated therewith for condensing part of the steam in the entering dispersion. The remainder of the steam passes off the top through a conduit 115 and enters a condenser 117.

The disintegrated cyanided ore particles mixed with that part of the steam which is condensed in separator 111, leave the bottom and are delivered to a filter press or other suitable separator 119 wherein the cyanide solution is separated and recovered from the gangue.

Periodically the filter cake in the filter press 119 is washed with water from condenser 117 and cooling coil 113, which is delivered through a conduit 121 and three way valve 123 to the filter press. However, when using a continuous rotary filter, washing of the cake is continuous.

The conditions described in the foregoing example for the cyaniding portion of the system also apply here.

It is to be understood that when an ore contains a substantial quantity of sulfide mineral, or when gold is present in the form of telluride, a preliminary roasting treatment may be employed before treating the ore by the present invention. Otherwise, the sulfide and telluride minerals may seriously deplete the cyanide reagent due to the decomposition of such minerals at the relatively high temperature in the heater coils and subsequent parts of the system.

Roasting of such ores is generally done before the amalgamation step, but could be performed between the amalgamation and cyanidation steps if desired.

Obviously, many modifications and variations of the invention, as hereinbefore set forth, may be made without departing from the spirit and scope thereof, and therefore only such limitations should be imposed as are indicated in the appended claims.

We claim:

1. A process for recovering metal values from gold and silver ores, said process comprising forming a first flowable mixture of particles of said ore with water and liquid mercury; passing said mixture as a flowing stream into and through a first confined heating zone; heating rapidly said mixture in said heating zone sufficiently to vaporize all of said water to steam; creating highly turbulent stream of flowing first dispersion consisting of said ore particles; said mercury and metal amalgam in steam; passing said dispersion in highly turbulent flow thereby disintegrating said ore particles and exposing clean metal value surfaces thereon whereby said mercury contacts and amalgamates with metal values, forming an amalgam; separating said amalgam from the residual ore particles; and then subjecting said residual ore particles to cyanidation to recover the remaining metal values therefrom.

2. A process in accordance with claim 1 wherein said residual ore particles are subjected to cyanidation in the presence of oxygen by forming a second flowable mixture of said residual ore particles in a water solution of alkali metal cyanide; feeding said mixture as a flowing stream into and through a second confined heating zone; heating said mixture in said heating zone sufficiently to vaporize all of the water from said solution to steam; creating a highly turbulent stream of flowing second dispersion consisting of said residual ore particles and said cyanide in steam; disintegrating said residual ore particles to a finer size by passing said dispersion through a succeeding zone of high velocity flow and subjecting the flowing stream therein to turbulence and a high velocity; and then separating the resulting cyanide reaction products from the resulting gangue.

3. A process in accordance with claim 2, also comprising separating steam from said first dispersion; and passing said steam in heat exchange relationship with said second flowable mixture.

4. A process in accordance with claim 2, wherein said separating is accomplished by at least partially condensing the steam in said second dispersion as it leaves said heating zone, to form a third mixture of cyanided fine ore particles in water; dissolving said cyanide reaction products in said water; and then separating the resulting cyanide solution from said gangue.

5. A process in accordance with claim 2 wherein oxygen is introduced into said second heating zone.

References Cited in the file of this patent

UNITED STATES PATENTS

| | | |
|---|---|---|
| 293,157 | Francke | Feb. 5, 1884 |
| 531,108 | Forbes | Dec. 18, 1894 |
| 543,673 | Crawford | July 30, 1895 |
| 723,304 | Prindle | Mar. 24, 1903 |
| 726,802 | Nichols | Apr. 28, 1903 |
| 1,193,197 | Smith | Aug. 1, 1916 |
| 1,204,069 | Robinson | Nov. 7, 1916 |
| 1,736,072 | Duschak | Nov. 19, 1929 |
| 2,293,066 | Lord | Aug. 18, 1942 |
| 2,740,707 | Herrmann | Apr. 3, 1956 |
| 2,773,749 | Pirtle | Dec. 11, 1956 |
| 2,777,764 | Hedley et al. | Jan. 15, 1957 |
| 2,839,387 | Burton et al. | June 17, 1958 |

FOREIGN PATENTS

| | | |
|---|---|---|
| 119,664 | Australia | Mar. 22, 1945 |

OTHER REFERENCES

Comprehensive Inorganic Chemistry, vol. 2, 1954, D. Van Nostrand Company, Inc., New York, pages 190–193, 195–206, and 117–122, relied on.